July 26, 1949.  F. RIEBER  2,477,085
FREQUENCY CONTROLLED MICROMETER
Filed May 19, 1944
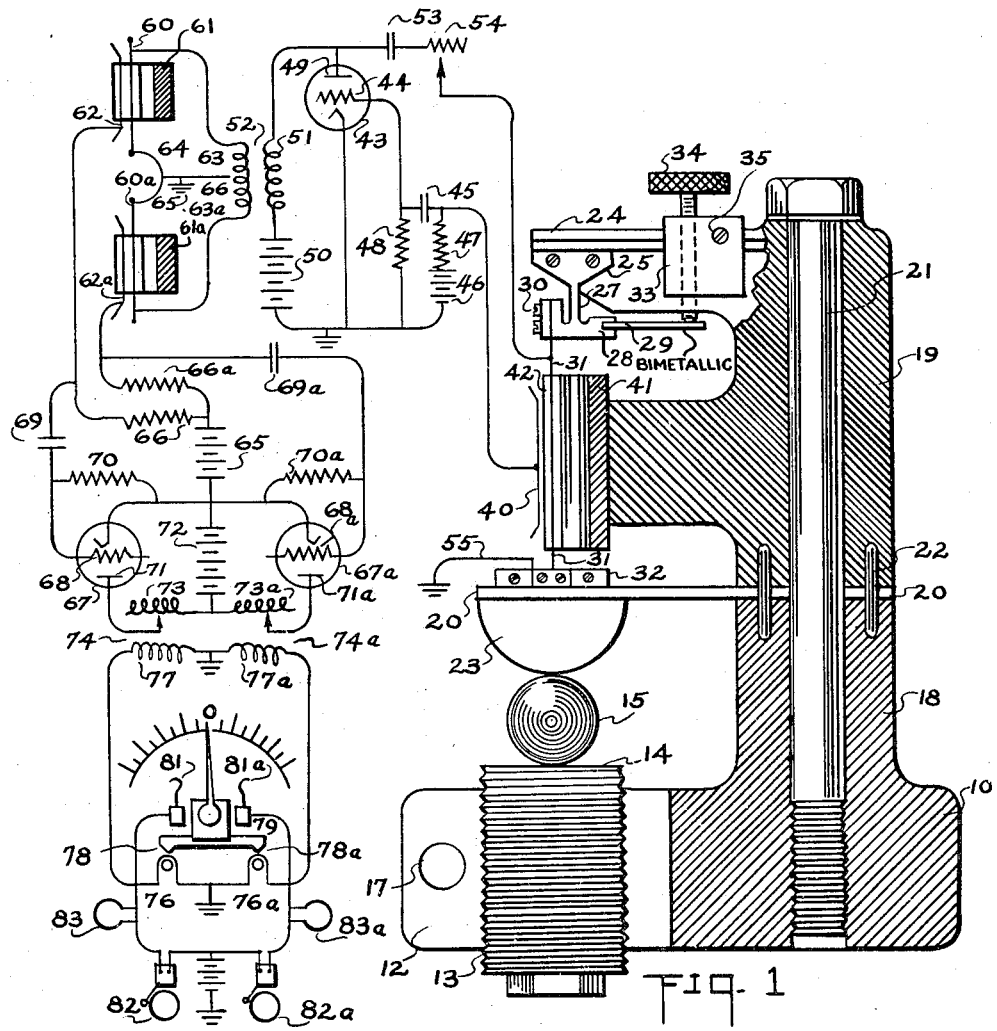
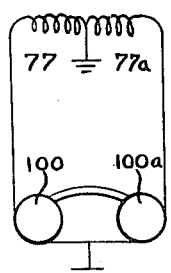
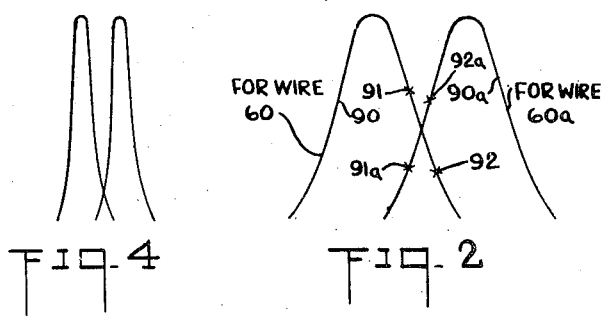
INVENTOR.
FRANK RIEBER
BY
ATTORNEY.

Patented July 26, 1949

2,477,085

UNITED STATES PATENT OFFICE 2,477,085

FREQUENCY CONTROLLED MICROMETER

Frank Rieber, New York, N. Y., assignor to Interval Instruments, Inc., New York, N. Y., a corporation of New York Application May 19, 1944, Serial No. 536,408

11 Claims. (Cl. 33—148)

1

This invention relates to a vibronic micrometer.

It is an object of this invention to provide a micrometer or test gauge suitable for making measurements of extreme accuracy. The invention is applicable to a wide variety of uses, but in the particular embodiment herein chosen for illustration, it is adapted to inspection of parts in quantity production or to the measurement of minute differences of a part from a standard. In the making of accurate measurements, it is impractical to rely upon screws or other power magnifying devices as a means of making the measurement, since the resultant measurements are subject to all of the mechanical imperfections of the power multiplying device itself. In accurate production, therefore, it is customary to employ gauges which are of solid material and accurately machined to the size desired.

Even in the use of such gauges, however, difficulty is experienced in getting extremely accurate measurements, partly because of the compressibility of the materials to be measured, so that some pieces pass through such a gauge more easily than others, even though both contact the gauge elements. Thus exact measurement by such a gauge requires a personal estimate of the ease of passage through the gauge. This is a severe limitation on the accuracy of work tested in such a manner.

In quantity production it is a common practice to employ a pair of gauges, one of which is larger than the desired size by the degree of overtolerance, and one of which is smaller than the required size by the degree of undertolerance, and parts are accepted for production if they will pass the former gauge but not the latter. This, however, gives no clue to the inspection department as to how great the variations really are within those limits, and it does not free the test from error due to forcing the test piece through a gauge with a little more or a little less force than was intended, and thus passing a piece which exceeds the tolerances.

It is a further object of this invention to provide a device which will accurately measure size without relying upon human estimating abilities.

It is a further object to provide a gauge which in a single operation will measure the size of a part with extreme accuracy and which will automatically determine how far above or below standard it is, and if desired, operate a signal system whenever predetermined tolerances are exceeded.

Most devices for accurate measurements, that

2 is, for measurements to one one hundred thousandth of an inch or less must be conducted with a delicacy and care which makes them difficult to employ in manufacturing processes, and, when carelessly employed, the accuracy for which they are constructed may not be attained.

It is an object of this invention to provide a machine which will enable measurements to be made to a fraction of a hundred thousandth of an inch, and yet which will do so with a rigidity and simplicity, such that measurements may be made accurately and rapidly in commercial production.

It is a further object to produce a device which in a single measurement will serve as both an under and an over gauge, but which by a simple manipulation can be adjusted to provide for different tolerances in either or both directions.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which:

Fig. 1 is a side elevation of an instrument embodying this invention, shown partly in section, and diagrammatically connected to an electrical circuit with which it functions.

Fig. 2 is a wave form diagram of the currents employed.

Fig. 3 is a detail of a modification.

Fig. 4 is a diagram of a wave form appropriate for use with this modification.

In the drawings, the numeral 10 designates a base having a forwardly extending portion 12 in which is accurately threaded a screw 13 having its upper face accurately surfaced to serve as a lower anvil 14, on which the work to be measured may rest. This work is shown in the drawings as a ball 15. This forwardly extending portion 12 is slotted, and at the free end is provided with a clamping screw 17 which operates in a threaded aperture to clamp the screw in any adjusted position.

Mounted upon the base 10 is a column 18 which supports a bracket 19 and a spring 20 which extends outwardly from the column. As here shown, this spring is clamped between the column 18 and the bracket 19 by a bolt 21. Pins 22 may be employed to hold the parts 18, 19 and 20 against rotation. The spring extends forwardly over the lower anvil 14 and carries upon its under surface a hardened member serving as the upper anvil 23. This member is here shown as having a convex cylindrical lower surface, but it will be obvious that different faces may be employed, dependent upon the nature of the work to be measured.

The making of accurate measurements between two anvils depends upon a very accurate determination of either the pressure exerted by the anvils upon the work or the amount by which one of the anvils is physically moved by the insertion of the work between the anvils under a substantially constant pressure, or both.

In accordance with this invention, in determining the movement of the anvil by the insertion of the work, I rely upon the principle that a stretched wire, one end of which is rigidly held, will change its tension very greatly with very slight movements of the other end, and that this change in tension produces a change in the natural frequency of vibration of the wire, according to well known laws.

Mounted upon the upper end of the bracket 19 is a horizontally extending arm 24, on the outer end of which there is fastened the head portion 25 of a member, which is connected by a thin neck 27 with a body portion 28. The rear end of this body portion has fastened thereto a bimetallic strip 29 and its forward end carries a clamping block 30 between which and the body portion there is clamped the upper end of a wire 31. The lower end of this wire 31 is carried in an insulating block 32 fastened to the upper side of the spring 21, the parts being here shown as being so dimensioned that the wire 31 is in alignment with the point of contact between the ball 15 and the anvils 14 and 23.

Slidably mounted upon the arm 24 is a crosshead 33 carrying a screw 34 operated by milled head, the screw being in position to engage the bimetallic strip 29 at varying distances from the neck 27 dependent upon the position of the crosshead upon the arm 24, and a screw 35 is arranged to clamp the crosshead in any adjusted position. The purpose of the bimetallic strip 29 is to compensate for all variations in temperature within the device, and the purpose of the movement of the crosshead 33 is to permit the calibration of the instrument by varying the effect of the bimetallic strip by varying its effective length. The neck 27 serves as a resilient hinge so that the force of the screw 34, in bearing upon the bimetallic strip, acts to vary the tension in the wire 31.

In actual practice I have found that a drawn tungsten wire of about one mil in diameter and two inches in length will stretch about one one hundredth inch without danger of breakage, and such a wire will vibrate satisfactorily at lower tensions at a frequency of about 1000 cycles which will increase to something over 3000 cycles when fully stretched. In accordance with this invention, I rely upon the measurement of this change of frequency as an index of the amount by which the lower end of the wire has been moved by the insertion of the work 15 beneath the anvil 23.

In my copending application filed January 29, 1944 and bearing Serial No. 520,197, I have disclosed a system in which an oscillating circuit has its frequency determined by the rate of vibration of such wire, and I have chosen herein to employ such a circuit because of its sensitiveness and simplicity. That case has now been abandoned.

I therefore mount parallel to the wire 31 and insulated from it an electrode 40, and I provide a magnet 41 having its pole faces 42 disposed to establish lines of force transverse to the plane defined by the wire 31 and the electrode 40.

The numeral 43 designates an amplifying device herein shown as a vacuum tube having a grid 44 connected through a condenser 45 with the electrode 40, and a battery 46 acting through a resistance 47 maintains a potential upon the electrode, and a grid bias resistance 48 is connected to the grid. The plate 49 of the tube is energized by a battery 50 acting through the primary 51 of a transformer 52, and the plate is also connected through a condenser 53 and a feed-back control resistance 54 with the upper end of the wire 31, the lower end of which is connected to ground, as at 55. With this arrangement, as will be understood, the oscillating circuit will have its frequency determined by the variations in capacity between the wire 31 and the electrode 40, which is in turn determined by the frequency of the wire 31.

It will be understood that when the test piece 15 is exactly of the same size as the standard by which the instrument has been calibrated, that the tension upon the wire 31 will be the same, and as a consequence the rate of oscillation of the tube 43 will be the same. These conditions we may for convenience refer to as standard. If, however, the test piece be only slightly larger, the upper anvil will be raised by an amount equal to the overage. The tension upon the wire 31 will thus be relieved, and the frequency will drop. Similarly, if the test piece be only slightly smaller, the anvil 23 will not be raised so far and the spring arm will be in position to exert greater tension upon the wire 31 and the frequency of the oscillating system will rise.

This invention, therefore, contemplates a means for discriminating between all frequencies in excess of the standard and all of those which are less than standard, and to determine how far that variation is.

Within the scope of this invention, therefore, I may employ any frequency responsive means which will indicate when the frequency corresponding to the piece to be tested departs from the standard. For many purposes, however, it is desirable to examine the range between the standard size and the over and under tolerances with great sensitiveness. On this account I prefer to employ an oscillating system described in my copending application above referred to, for each of these ranges; that is, I provide one oscillator of that type tuned to respond to a frequency slightly above the standard, and one tuned slightly below.

The numerals 60 and 60a comprise wires stretched in the field of magnets 61 and 61a respectively and having electrodes 62 and 62a held in spaced relation to them. The wires 60 and 60a are attuned to slightly different frequencies, the wire 60a being slightly above the standard frequency, and the wire 60 being slightly below. The wire 60 is fed with energy from a secondary 63 of the transformer 52, and the wire 60a is similarly fed with energy from the secondary 63a of the same transformer. As shown, the wires are connected together at 64, and at this point are connected to ground at 65 and to a point of connection 66 between the coils 63 and 63a. The battery 65 feeds energy to the electrode 62 through a resistance 66 and feeds energy to the electrode 62a through a resistance 66a. The numerals 67 and 67a designate vacuum tubes, the grids 68 and 68a of which are connected through condensers 69 and 69a with the electrodes 62 and 62a respectively, and the bias of the grids is determined by resistances 70 and 70a. The plates 71 and 71a are fed with energy from a battery 72 through the primaries 73 and 73a respectively of transformers 74 and 74a.

Means are provided for comparing the energy supplied by the two oscillating circuits which, as shown, comprise a differential thermal ammeter having a thermal element 76 connected across the secondary 77 of the transformer 74 and a thermal element 76a connected across the secondary 77a of the transformer 74a. A thermo-couple 78 in position to be affected by the member 76 and a thermo-couple 78a in position to be affected by the member 76a are arranged to actuate the ammeter 79 differentially, so that the needle of the instrument assumes a position dependent upon the relative amounts of energy supplied by the two oscillating systems. This ammeter may be calibrated to read the actual variations of the test piece 15 from the standard in terms of fractions, say .00001", and may of course have indicated upon it the extreme limits which the particular operations permit. The instrument may also be provided, if desired, with contacts 81 and 81a, each connected to operate an audible signal 82, 82a or a visible signal such as a light 83 or 83a. It will be desirable to have audible signals of different tone and the lights of different color.

Means are provided for adjusting the intensity of the energy fed by the two oscillating systems so that when the vibrating wire 31 is vibrating at its normal frequency, the meter 79 will be at its midpoint. This means is herein conventionally shown by making the primaries of the transformers 74 and 74a adjustable.

The device may be originally adjusted as follows: A standard test block of dimensions which will pass inspection, and preferably as close to the exact dimensions as possible, and preferably also made of material with a negligible coefficient of thermal expansion, is placed between the anvils 14 and 23 of the apparatus, and the position of the lower anvil 14 is adjusted until a firm contact is made with the upper anvil without undue pressure, whereupon it is locked by the screw 17. The screw 34 is then adjusted until the vibratory frequency of the wire reaches some appropriate value, while the machine is at a known temperature. The temperature is thereafter changed in value by a known amount and the frequency of the vibrating wire is again observed. If there is any difference between these readings, the position of the crosshead 32 is adjusted to vary the effective length of the bimetallic strip 29 until a position is found where the frequency of the wire 31 is maintained constant, notwithstanding temperature changes.

This setting of the temperature compensating mechanism will normally prove constant.

We may now insert between the anvils a test block which is larger than the standard by a known amount, and we thereupon tune the wire 60 by altering its tension until the maximum response is obtained. Thereupon we may place between the anvils a second test block correspondingly smaller than standard and similarly tune the wire 60a.

In Fig. 2 there is shown the response of the oscillatory systems to varying frequencies of the wire 31, and from this figure it will be seen that at low frequencies we have substantially no response from either of these oscillating systems. When we approach, however, the point of resonance of the oscillating wire 60, we have a very sharp rise in the response, reaching its peak at the resonant point and then falling off with equal sharpness. This is shown in the curve indicated by the numeral 90. Similarly, as we approach the point of resonance of the wire 60a, we find that it commences to oscillate, and this oscillation increases to its peak value, as shown at 90a, just as the curve 90 did, but this value will be at a higher frequency than the peak value of the curve 90 by an amount corresponding to the difference in size of the two test pieces tested.

The sharpness of these resonant curves can in considerable measure be controlled by altering the sources of energy loss within the system, such as by placing the device in vacuum if very sharp response is desired. Any specimen which is placed between the anvils will increase or relieve the tension upon the wire 31 in exact correspondence to its size, and as a result thereof the proportion of energy supplied to the ammeter 79 by the two oscillating systems will be determined by the proportionate response of the two oscillating systems to the particular frequency of the wire 31. Thus if the specimen be larger than the standard, the wire 31 will respond at lower frequency than its standard and this frequency will come closer to the peak frequency of the wire 60, and further from the peak frequency of the wire 60a. This point of response of member 76 to the oversize piece may be represented on curve 90 by the point 91 and the corresponding response of member 76a by point 91a. Thus the energy at point 91 will overbalance that at point 91a and will move the needle in one direction to indicate that fact. It will furthermore be clear that the amount of this swing will be in exact relation to the shape of the curves 90 and 90a and their distance apart, so that the amount of this swing can be directly calibrated into fractions of an inch variation in the piece being tested.

If, on the other hand, the test piece be smaller than the standard, the frequency of the wire 31 will increase. This will lower the response on the curve 90 to the point 92 and will increase the response on the curve 90a to the point 92a. Under such circumstances, it is the right-hand thermo-couple 78a which will assume dominance of the ammeter and swing its indicating hand to the opposite.

The contacts 81 and 81a may be adjusted to operate the indicating mechanism 82 or 83 at any desired distance from the standard point, and thus permit a variation in the tolerances at will.

Moreover, since the conformance of the test piece to the standards is made visible, it is possible for the foreman to check the tester at any time to determine whether, in fact, the standards are being maintained.

When the device is used in the manner above described, it will be found desirable to have the peak curves, as shown in Fig. 2, overlap each other to the point where at the central position both curves can actuate the needle of the ammeter to hold it in a central position. If, therefore, for any purpose it is desirable to place the peak value of the two curves a greater distance apart, it will also be desirable to flatten the curves so that they will still intersect with enough power in both circuits to maintain the position of the needle.

In Fig. 3 there is illustrated a modification of the device in which, instead of employing the ammeter 79, the secondaries 77 and 77a are connected respectively across the ear phones 100 and 100a of a split telephone head set, the mid-point of the head set and the mid-point between the secondaries being connected to ground, as shown.

With this construction, when the wire 31 is vibrating at the frequency of the oscillator 67, the maximum response will be heard in the receiver 100. If now the frequency be increased, the response of the receiver 100 will decrease until at the mid-point it becomes equal to that of the receiver 100a and thereon dies off, while the receiver 100a pushes on to its maximum value. With this arrangement it is desirable that the test pieces by which the apparatus is tuned shall themselves correspond to the over-tolerance and under-tolerance values, so that the maximum response is reached in either head set as soon as these tolerances are reached. It follows, therefore, that in testing a work piece, if the operator hears in both ears nearly alike, the piece itself lies between the tolerances allowed. But if either ear piece reaches its maximum value, then the work piece itself is at the limit of tolerance or beyond, as the instrument may be set.

With this construction it is desirable that the resonance peaks of the two oscillating circuits, as shown in 52, shall be quite steep, and preferably so arranged that when either curve reaches its peak value, the other will be substantially at zero value.

For some purposes it may be desirable so to adjust the frequencies and the steepness of the resonance curves that the curves do not substantially intersect, so that a period of relative quiet exists at the standard point.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A micrometer device for determining the departure of a piece to be tested from a standard, comprising a stationary anvil and a movable anvil urged toward the stationary anvil, and arranged to be separated therefrom by the work to be measured, a wire connected at one end to a stationary support and at the other end connected to the movable anvil, whereby small changes in the position of the anvil will change the tension on the wire, oscillating means to maintain the wire in vibration adapted to maintain a standard speed of vibration when the anvils are separated by a standard piece, and means for developing an effect representative of the frequency when a piece is inserted between the anvils.

2. A micrometer device for determining the departure of a piece to be tested from a standard, comprising a stationary anvil and a movable anvil urged toward the stationary anvil, and arranged to be separated therefrom by the work to be measured, a wire connected at one end to a stationary support and at the other end connected to the movable anvil, whereby small changes in the position of the anvil will change the tension on the wire, oscillating means to maintain the wire in vibration adapted to maintain a standard speed of vibration when the anvils are separated by a standard piece, and means for indicating the frequency when a piece is inserted between the anvils, comprising a pair of oscillators connected to said oscillating means, tuned to oscillate at different frequencies, one just above and one just below the standard frequency, and means differentially connected to said oscillators for determining which oscillator is more strongly actuated.

3. A micrometer device for determining the departure of a piece to be tested from a standard, comprising a stationary anvil and a movable anvil urged toward the stationary anvil, and arranged to be separated therefrom by the work to be measured, a primary wire connected at one end to a stationary support and at the other end connected to the movable anvil, whereby small changes in the position of the anvil will change the tension on the primary wire, oscillating means to maintain the primary wire in vibration adapted to maintain a standard speed of vibration when the anvils are separated by a standard piece, means for indicating the frequency when a piece is inserted between the anvils, comprising a pair of oscillators, each having a secondary wire held under tension, means to urge said wires into vibration at the frequency of said first mentioned wire, and means connected to determine the frequency of each of said secondary wires, said wires being tuned above and below the standard frequency, and means differentially connected to said oscillators for determining which oscillator is more strongly actuated.

4. A micrometer device for determing the departure of a piece to be tested from a standard, comprising a stationary anvil and a movable anvil urged toward the stationary anvil, and arranged to be separated therefrom by the work to be measured, a primary wire connected at one end to a stationary support and at the other end connected to the movable anvil, whereby small changes in the position of the anvil will change the tension on the primary wire, oscillating means to maintain the primary wire in vibration adapted to maintain a standard speed of vibration when the anvils are separated by a standard piece, means for indicating the frequency when a piece is inserted between the anvils, comprising a pair of oscillators, each having a secondary wire held under tension, means to urge said wires into vibration at the frequency of said first mentioned wire, and means connected to determine the frequency of each of said secondary wires, said wires being tuned above and below the standard frequency, and a meter differentially connected to said oscillating circuits, constructed and arranged to respond to the difference between the energy supplied by said circuits.

5. A micrometric measuring device comprising a stationary anvil, a movable anvil urged toward the stationary anvil, constructed and arranged to be separated therefrom by the work to be measured, a wire stretched between a fixed point and said movable anvil, oscillating means for maintaining said wire in vibration at the frequency of said wire, and means for developing an effect representative of the frequency of said vibration.

6. A micrometric measuring device comprising a stationary anvil, a movable anvil urged toward the stationary anvil, constructed and arranged to be separated therefrom by the work to be measured, a vibrating member, connections between said movable anvil and said member operated by the movement of said anvil to vary the rate of vibration of said member, means for vibrating said member and means for determining the frequency of vibration, comprising a pair of oscillators tuned to oscillate at slightly different frequencies, and means differentially responsive to said oscillators.

7. A device for making micrometric measurements including a pair of anvils, one of said anvils being adjustable to accommodate different size test pieces, and the other one being resiliently supported for movement toward and from the adjustable anvil, a wire connected at one end to said movable anvil and at the other end to a fixed support, an oscillating circuit including said wire being connected to have its frequency determined by the rate of vibration of said wire, and means connected to said fixed support for adjusting the tension on said wire.

8. A device for making micrometric measurements including a pair of anvils, one of said anvils being adjustable to accommodate different size test pieces, and the other one being resiliently supported for movement toward and from the adjustable anvil, a wire connected at one end to said movable anvil and at the other end to a fixed support, an oscillating circuit including said wire being connected to have its frequency determined by the rate of vibration of said wire, means connected to said fixed support for adjusting the tension on said wire, and a pair of discriminating devices adjusted to a frequency above and below the standard frequency whereby the departure of the frequency of said wire from the standard frequency may be determined.

9. A device for accurately gauging the size of a part comprising a pair of elements movable relative to each other to caliper the part, a stretched wire connected to have its tension altered by said movement of said elements and means for indicating when the tension is at a predetermined standard comprising means to maintain said wire in vibration, a pair of oscillators tuned to different pitches, one slightly above and one slightly below the standard, connected to said wire, and a differential indicating device to indicate the relative responses of said oscillators.

10. A device for accurately gauging the size of a part comprising a pair of elements movable relative to each other to caliper the part, a stretched wire connected to have its tension altered by said movement of said elements and means for indicating when the tension is at a predetermined standard comprising means to maintain said wire in vibration, a pair of oscillators tuned to different pitches, one slightly above and one slightly below the standard, connected to said wire, a differential indicating device to indicate the relative responses of said oscillators, said oscillators having their peak frequencies such that each gives a substantial response at standard frequency, and a differential meter connected to said oscillators constructed and arranged to indicate the relative response of said oscillators at the standard frequency of the wire.

11. A device for accurately gauging the size of a part comprising a pair of elements movable relative to each other to caliper the part, a stretched wire connected to have its tension altered by said movement of said elements and means for indicating when the tension is at a predetermined standard comprising means to maintain said wire in vibration, a pair of oscillators tuned to different pitches, one slightly above and one slightly below the standard, connected to said wire, a differential indicating device to indicate the relative responses of said oscillators, said oscillators having their peak frequencies such that one oscillates at the high limit of tolerance and the other at the low, and a split telephone head set having the ear pieces connected respectively to said oscillators.

FRANK RIEBER.

REFERENCES CITED

The following references are of record in the file of this patent:

UNITED STATES PATENTS

| Number | Name | Date |
| --- | --- | --- |
| 1,727,328 | Affel | Sept. 10, 1929 |
| 2,081,738 | Conover | May 25, 1937 |

FOREIGN PATENTS

| Number | Country | Date |
| --- | --- | --- |
| 434,509 | Great Britain | Sept. 3, 1935 |